July 4, 1950 T. O. HUUS 2,514,242
HUB ASSEMBLY FOR WHEELS, GEARS, PULLEYS AND THE LIKE
Filed June 15, 1948
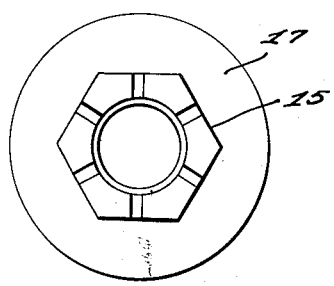
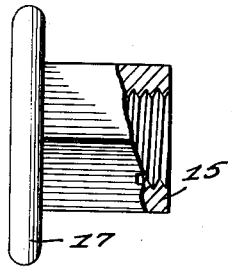
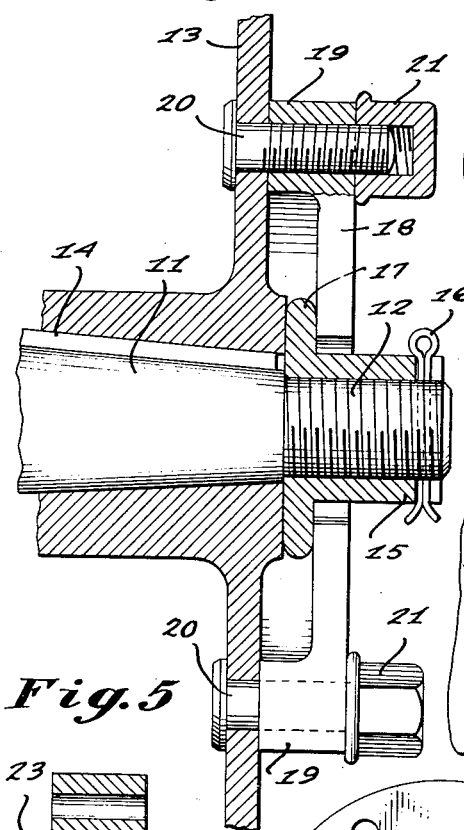
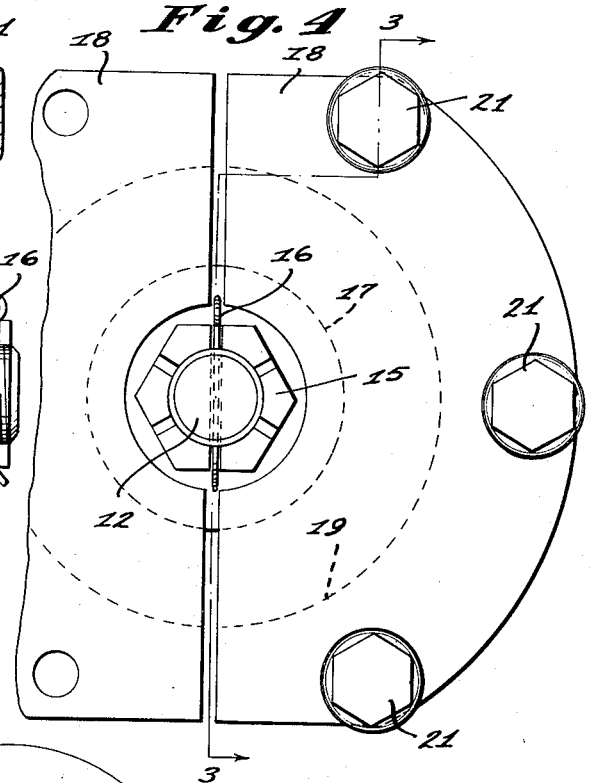
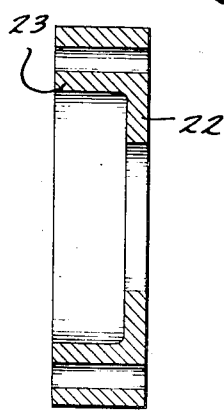
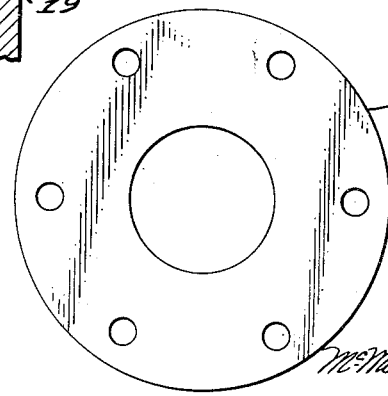
INVENTOR.
Theodore O. Huus
BY
McMorrow, Berman & Davidson
ATTORNEYS Patented July 4, 1950

2,514,242

UNITED STATES PATENT OFFICE 2,514,242

HUB ASSEMBLY FOR WHEELS, GEARS, PULLEYS, AND THE LIKE

Theodore O. Huus, Plaza, N. Dak.

Application June 15, 1948, Serial No. 33,073

1 Claim. (Cl. 287—53)

This invention relates to hub assemblies for wheels, gears, pulleys, and the like, and more particularly to a hub assembly which is secured against accidental loosening and which may be readily taken apart when desired.

A main object of the invention is the provision of a novel and improved hub assembly for wheels, gears, and the like, which is simple in construction, provides a secure connection to a shaft or axle, and which provides means for pulling the wheel or similar member from the shaft or axle with a minimum amount of labor.

A further object of the invention is to provide an improved hub assembly for securing a wheel, gear or similar member to a keyed shaft or axle, which is sturdy in construction, involves only a few parts and which provides means for quickly removing the wheel or similar member from the shaft or axle without requiring a special wheel-pulling implement.

Further objects and advantages of the invention will become apparent from the following description and claims and from the accompanying drawings, wherein:

Figure 1 is a front view of a flanged hub nut employed in the hub assembly of the present invention.

Figure 2 is a side view, partly in cross-section of the hub nut of Figure 1.

Figure 3 is a vertical cross-sectional view taken through a hub assembly constructed in accordance with the present invention, said view being taken on line 3—3 of Figure 4.

Figure 4 is a fragmentary front elevational view of the hub assembly of Figure 3.

Figure 5 is a vertical cross-sectional view taken through a modified form of hub plate in accordance with the present invention.

Figure 6 is a front elevational view of the hub plate of Figure 5.

Referring to the drawings, 11 designates the tapered end of a shaft or axle, said end terminating in a threaded stud portion 12. Designated at 13 is a wheel, gear, pulley, or similar member, which is mounted on the shaft end 11 and is suitably keyed thereto by a key 14 received in opposing keyways formed in end 11 and the hub portion of the wheel member 13. Threaded on stud portion 12 is a nut member 15, which may be of the castellated type, whereby it may be locked to said stud portion by a cotter-pin 16. Nut member 15 is formed with a flange 17 which bears on the end of the hub portion of the wheel member 13, as shown in Figure 3.

Designated at 18, 18 are a pair of hub plate segments formed with thickened peripheral portions 19 which bear against the wheel member 13 outwardly of its hub portion and which serve as spacers for the inner portions of the segments, said inner portions bearing on the flange 17 of the nut member 15. Extending through the wheel member 13 and the thickened peripheral portions 19 of the respective hub plate segments 18, 18 are a plurality of bolt members 20 and threaded on the ends of said bolt members are the cap nuts 21. The cap nuts 21 cooperate with bolt members 20 to hold the hub plate segments 18, 18 in overlying relation to the flange 17 of hub nut 15, and prevent the nut from coming off the stud portion 12 in the event that the cotter-pin 16 is lost.

The wheel member is mounted on the shaft by first engaging its keyway with the key 14 carried in the shaft keyway in the usual manner and forcing it as far as possible manually on the tapered shaft end 11. Nut 15 is then threaded on the stud portion 12 and tightened until flange 17 has forced the wheel member fully onto said tapered shaft end. The segments 18, 18 are then secured on the wheel member in the positions shown in Figures 3 and 4 by means of the bolt members 20 and the cap nuts 21. The cotter-pin 16 may then be inserted through the cotter-pin opening provided in the end of stud portion 12.

To remove the wheel member 13 from the shaft, the cotter-pin 16 is first removed and nut member 15 is then unthreaded from stud portion 12. Flange 17 transmits an outward axial thrust to the wheel member through the segments, 18, 18 which loosens the wheel member from the tapered shaft end 11 and effects the separation of said wheel member from the shaft end without requiring the employment of a special wheel-pulling implement to overcome the frictional force holding the wheel member on the shaft.

Instead of using separate hub plate segments 18, 18, a single hub plate member 22 may be employed, as shown in Figures 5 and 6, said single hub plate member having the thickened peripheral portion 23 corresponding to the portions 19 of the segments 18, 18. The inner portion of the single hub plate member 22 overlies the flange 17 of the hub nut 15 in the same manner as described above in connection with the segments 18, 18.

While certain specific embodiments of the hub assembly for wheels, gears, pulleys and the like, have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A hub assembly comprising a tapered shaft element formed at its end with a threaded stud portion, a wheel member having a central hub portion fitting on said shaft element, a non-circular nut member threaded on said stud portion, said nut member being formed with a flange engageable with said wheel member, a plate member encircling said nut member and overlying said flange, said nut member projecting externally from said plate member, said plate member being formed with a thickened peripheral portion, and means securing said thickened peripheral portion to the wheel member, whereby outward thrust exerted by said flange relative to said shaft element is transmitted through the plate member to the wheel member.

THEODORE O. HUUS.

REFERENCES CITED

The following references are of record in the file of this patent:

UNITED STATES PATENTS

| Number | Name | Date |
|---|---|---|
| 835,031 | Myers | Nov. 6, 1906 |

FOREIGN PATENTS

| Number | Country | Date |
|---|---|---|
| 528,972 | France | Nov. 22, 1921 |